United States Patent [19]

Bowman

[11] 4,377,920
[45] Mar. 29, 1983

[54] WICK APPLICATOR FOR HERBICIDES

[75] Inventor: David N. Bowman, Newport, Ark.

[73] Assignee: Bowman Manufacturing Co., Inc., Newport, Ark.

[21] Appl. No.: 236,293

[22] Filed: Feb. 19, 1981

[51] Int. Cl.³ ............................ A01N 5/00; B05B 1/28
[52] U.S. Cl. ........................................ 47/1.5; 239/121
[58] Field of Search ................................ 47/1.5, 1.7; 239/120-121

[56] References Cited

U.S. PATENT DOCUMENTS

| | | | |
|---|---|---|---|
| 4,168,798 | 9/1979 | Moore et al. | 47/1.7 X |
| 4,187,638 | 2/1980 | Hardy et al. | 47/1.5 |

*Primary Examiner*—Robert E. Bagwill
*Attorney, Agent, or Firm*—Wegner, McCord, Wood & Dalton

[57] ABSTRACT

A wick applicator for herbicide which includes first and second horizontally elongated conduits. The first conduit is elevated above the second conduit and a plurality of wicks extend between the conduits and are in fluid communication with the interior of each. Herbicide is provided to the interior of the first conduit while a vacuum is applied to the interior of the second conduit to withdraw herbicide therefrom which is directed thereto by the wicks. A pump is utilized for the purpose and the same recirculates the herbicide back to the first conduit to conserve on herbicide use and to provide a fine degree of control over the flow rate of herbicide through the wicks.

10 Claims, 5 Drawing Figures

U.S. Patent   Mar. 29, 1983   4,377,920
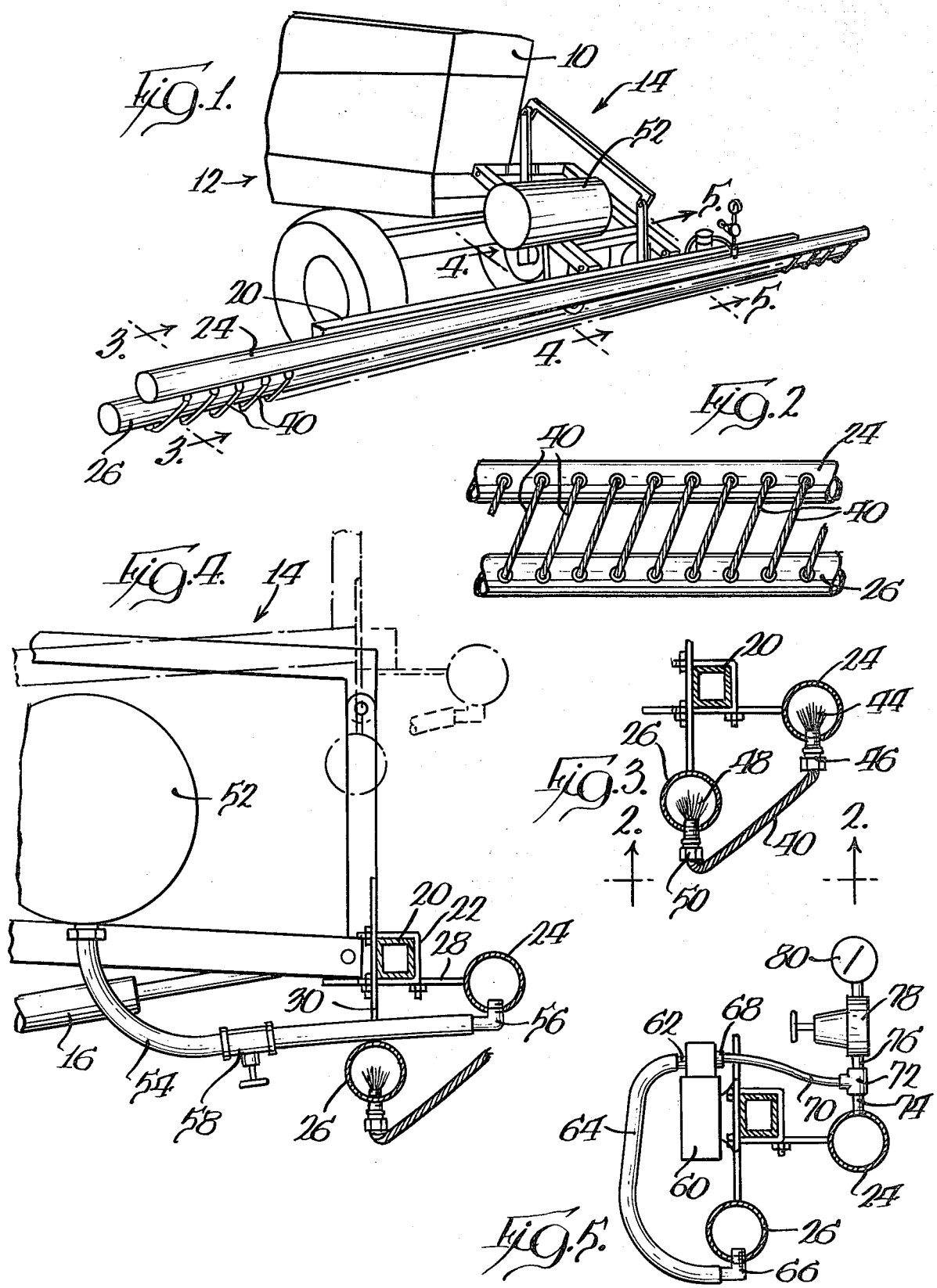

WICK APPLICATOR FOR HERBICIDES

FIELD OF THE INVENTION

This invention relates to wick applicators for herbicides, and more specifically, to a wick applicator that provides enhanced control of herbicide application while minimizing herbicide consumption during the application process.

BACKGROUND ART

Weed control of various types has long been practiced by the efficient farmers to maximize production of cultivated lands. Within the last view years, a new method of weed control that is particularly useful with crops such as soybeans and cotton has evolved, namely, the use of a so-called "wick applicator".

While a variety of wick applicators are commercially available, a typical example of a wick applicator is shown in U.S. Pat. No. 4,187,638 issued Feb. 12, 1980 to Hardy et al. In present day wick applicators as well as that illustrated in the above identified patent, a plurality of rope-like wicks have both ends in fluid communication with a reservoir of herbicide. The herbicide, through capillary action, substantially saturates the wicks.

Structure is provided for mounting the wicks in varying ways so that they may be passed over a planted area just above the tops of the plants being cultivated, such as soybeans, and below the tops of the weeds. Consequently, the weeds contact the rope-like wicks and as a result, the herbicide oozes from the wick onto the weeds to kill or otherwise control them.

Such wick applicators have a sizable advantage over other forms of herbicide application in that, at least in theory, the only herbicide used is that which is rubbed off the wick by the weed being contacted with the wick so that no more herbicide than is necessary is used. To a large degree, this is accomplished and relatively small quantities of herbicide may be used for weed control over relatively large areas thereby minimizing the cost of herbicide used for weed control.

However, while the use of wick applicators has resulted in a considerable advantage in the above respect, modern day wick applicators still are not as efficient as they might be. Not infrequently, a wick will be saturated to a greater degree than necessary with the herbicide with the consequence that the herbicide may drop from the wick simply under the influence of gravity or may be splashed from the wick during vibration occurring during operation of a vehicle utilized to move the wick applicator through a cultivated area, or even upon contact with the weed.

This dripping herbicide is of course lost and/or may fall upon desirable plants in the cultivated area inadvertantly killing them or reducing their yield.

Even more frequently, conventional wick applicators provide too little saturation of the wicks in order to avoid herbicide loss, resulting in ineffective weed control.

SUMMARY OF THE INVENTION

It is the principal object of the invention to provide a new and improved wick applicator for applying herbicide in weed control during agricultural operations. More specifically, it is an object of the invention to provide such a wick applicator wherein the degree of saturation of the wick with herbicide can be closely controlled and wherein any excess herbicide on the wick may be captured to prevent its loss.

An exemplary embodiment of the invention achieves the foregoing object in a wick applicator that includes a horizontally elongated frame including a manifold. Wick means are mounted on the frame and are in fluid communication with the manifold, the wick means being disposed so as to contact vegetation when the applicator is advanced across a planted area below the tops of vegetation growing in the area. Means are provided for directing a herbicide or the like to the wick means and means are associated with the manifold for causing excess herbicide or the like on the wick means to enter the manifold for collection therein.

According to a highly preferred embodiment of the invention, the frame is defined by first and second horizontally elongated conduits with the second conduit serving as the manifold. The wick means extend between the two conduits and herbicide is provided to the first conduit while herbicide is withdrawn from the second conduit.

In one embodiment of the invention, the first conduit is disposed above the second conduit so that gravity will cause the herbicide to flow from the first conduit through the wick toward the second contuit. The withdrawing means comprises a suction pump having an inlet in fluid communication with the second conduit to thereby establish a partial vacuum in the second conduit to assist in herbicide collection.

In a highly preferred embodiment, the outlet of the suction pump is in fluid communication with the interior of the first conduit to recirculate herbicide that has been collected. Additionally, the suction pump pressurizes the first conduit and means are provided for regulating the pressure in the first conduit to thereby provide accurate regulation of flow of herbicide from the first conduit through the wick to the second conduit to thereby accurately regulate the degree of saturation of the wick.

Other objects and advantages will become apparent from the following specification taken in connection with the accompanying drawings.

DESCRIPTION OF THE DRAWINGS

FIG. 1 is a perspective view of a wick applicator made according to the invention and mounted on the forward end of a vehicle whereby the wick applicator may be moved through a cultivated area;

FIG. 2 is a fragmentary sectional view of the wick applicator taken approximately along the line 2—2 in FIG. 3.

FIG. 3 is a fragmentary vertical section of the wick applicator taken at one point along its length;

FIG. 4 is a vertical section of the wick applicator along with additional system components; and FIG. 5 is still another vertical section of the wick applicator.

DESCRIPTION OF THE PREFERRED EMBODIMENT

An exemplary embodiment of a wick applicator made according to the invention is illustrated in the drawings and with reference to FIG. 1 is seen to be mounted on the front end 10 of a vehicle such as a tractor, generally designated 12. The mounting is accomplished by a conventional parallelogram linkage, generally designated 14 and which, as seen in FIG. 4, includes a hydraulic cylinder 16 whereby the wick applicator may be moved between the solid and dotted line positions illustrated in FIG. 4 so as to control its height above the underlying terrain. As is well known, it is desirable that the wick applicator pass over the tops of desirable crops and yet be sufficiently low so as to contact the tops of weeds growing above such crops to apply herbicide thereto. Through appropriate operation of the cylinder 16, the desired height control can be easily obtained.

With reference to FIGS. 1 and 4, the wick applicator includes a frame mounted on the forward end of the parallelogram linkage 14. The frame specifically includes a horizontally elongated, rectangular tube 20 formed of metal or the like secured as by U-bolts 22 to the parallelogram linkage 14. The frame further includes horizontally elongated conduits, the first of which is shown at 24 and the second one of which is shown at 26 which may be formed of plastic pipe or the like. The first conduit 24 is elevated above the second conduit 26 and forwardly thereof. At various points along its length, the conduit 24 is secured as by studs or plates 28 to the tube 20. Similar downwardly extending studs 30 along the length of the tube 20 mount the second conduit 26 to the tube 20.

In addition to forming part of the overall frame of the wick applicator, the conduits 24 and 26 serve additional purposes as well. The conduit 24 serves as a supply conduit or manifold while the conduit 26 serves as a collection conduit or manifold as will be seen.

Along the length of the conduits 24 and 26, a plurality of rope-like wicks 40 are located. The type of rope used to form the wicks 40 is conventional for the purpose and forms no part of the invention. As can be seen from FIG. 2, the wicks 40 extend diagonally between the conduits 24 and 26 and the orientation is such that for a direction of travel of the wick applicator transverse to the horizontal extent of the conduits 24 and 26, there will be no gap between adjacent one of the wicks 40 through which a weed could pass without being contacted by a wick 40. As is well known, the diagonal arrangement of the wicks insures prolonged contact of a weed with the wick to insure that adequate herbicide is deposited on such a weed.

As seen in FIG. 3, each wick 40 has an end 44 located within the interior of the conduit 24 and held in place by a conventional plastic compression fitting 46 entering the lowermost extent of the conduit 24. The opposite end 48 of each wick is disposed within the interior of the conduit 26 and again held in place by a conventional plastic compression fitting 50 entering the conduit 26 at its lowermost extent.

As seen in FIGS. 1 and 4, the applicator includes a herbicide reservoir 52 which preferably is either fixed to the vehicle 10 or is located so far rearwardly on the parallelogram linkage 14 that its vertical position will not change appreciably when the cylinder 16 is actuated to lift or lower the applicator. The reservoir 52 has an inlet for receipt of herbicide and an outlet hose 54 which is connected by an el 56 to the lowermost part of the first conduit 24. Preferably, a valve, shown schematically at 58 is located in the hose 54.

Thus, when the wick applicator is in the solid line or lowermost position as illustrated in FIG. 4, the valve 58 may be opened to fill the first conduit 24 with herbicide. Conversely, when the applicator is in an uppermost position such as that shown in dotted lines in FIG. 4, the valve 58 may be opened to allow herbicide within the first conduit 24 to drain back into the reservoir 52 for storage purposes.

Turning now to FIG. 5, at any desired location on the tube 20, there is mounted a suction or vacuum pump 60. The pump 60 has an inlet 62 which is connected by a hose 64 to the interior of the second conduit 26 by an el 66. The pump 60 also has an outlet, shown at 68, which is connected via a hose 70 to a tee 72. One side of the tee 72 is connected via a conduit 74 to the uppermost extent of the first conduit 24 while the other side of the tee 72 is connected via a pipe 76 to a conventional pressure regulator 78, typically in the form of an adjustable, low pressure popoff valve, and then to a pressure gauge 80. While not shown herein, the pump 60 is adapted to be operated by electrical power such as is available in the electrical system of the vehicle 12.

INDUSTRIAL APPLICABILITY

At the beginning of a herbicide application operation, a suitable herbicide is placed in the reservoir 52 and the valve 58 opened to fill the entire interior of the conduit 24 which is sealed at its ends. Once the same is filled, the valve 58 may be closed. The height of the applicator is adjusted corresponding to the differences between the heights of the desirable crop and the weeds to be killed and then moved through the field by the vehicle 12. Weeds contacted by the wicks 40 will have herbicide in the wicks applied thereto to be killed. After the application operation is completed, any remaining herbicide within the first conduit 24 may be returned to the reservoir 52 as mentioned previously.

It is important to observe that in the operation of the wick applicator of the present invention, the pump 60 will be in substantially continuous operation. Herbicide within the first conduit 24 will exit the same into the wicks 40 via the ends 44 and flow under the influence of gravity toward the ends 48 of the wicks 40. Any excess herbicide will be drawn into the second conduit 26 to be collected therein by reason of the fact that the pump 60 is applying a vacuum to the interior of the second conduit 26.

Additionally, the herbicide collecting in the second conduit 26 will exit the same via the el 68 to be passed through the vacuum pump 60 out of its outlet 68 to be returned to the first conduit 24, that is, recirculated, thereby conserving the herbicide.

Actual flow of herbicide out of the first conduit 24 can be solely under the influence of gravity if desired or, closely regulated by selecting a suitable setting for the pressure regulator 78. The outlet of the vacuum pump 60 will, of course, cause pressurization of the interior of the first conduit 24. The greater this pressure, the faster hebicide will flow out of the conduit 24. The exact pressure required to achieve any desired degree of saturation or flow of herbicide along the wicks 40 can, therefore, be selected by appropriate adjustment of the pressure regulator 78 which will release excess pressure in the conduit 24 to the atmosphere.

From the foregoing, it will be appreciated that precise control over the degree of saturation of the wicks 40 can be easily obtained. At the same time, excess herbicide that would normally accumulate at the low points on the wicks 40 from which it could drip and therefore be wasted or cause damage to underlying valuable crops is collected and returned to the system. Thus, the invention allows fine control of application of herbicide while insuring that there is no wastage of herbicide while protecting against inadvertant contact of the herbicide with valuable crop.

I claim:

1. A wick applicator for herbicide or the like comprising:

first and second horizontally elongated conduits, said first conduit being elevated above said second conduit;

wick means extending between said conduits and being in fluid communication with the interior of each said conduit, said wick means being disposed so as to contact vegetation when said applicator is advanced across a planted area below the tops of vegatation growing in such area;

means whereby a herbicide or the like is provided to the interior of said first conduit; and means for withdrawing herbicide or the like from said second conduit;

whereby herbicide or the like will flow from said first conduit through said wick means to said second conduit.

2. The wick applicator of claim 1 wherein said withdrawing means comprises a pump having an inlet in fluid communication with said second conduit.

3. The wick applicator of claim 2 wherein said pump has an outlet in fluid communication with the interior of said first conduit so that herbicide or the like withdrawn from said second conduit is recirculated to said first conduit.

4. The wick applicator of claim 3 wherein said pump pressurizes said first conduit; and further including means for regulating the pressure in said first conduit.

5. The wick applicator of claim 1 wherein said wick means comprise a plurality of ropes.

6. The wick applicator of claim 1 further including a frame mounting said first and second conduits, and further including means for controlling the flow of herbicide from said first conduit through said wick means to said second conduit.

7. A wick applicator for herbicides or the like comprising:

first and second horizontally elongated conduits;

wick means extending between said conduits and being in fluid communication with the interior of each said conduit, said wick means being disposed so as to contact vegetation when said applicator is advanced across a planted area below the tops of vegetation growing in such area;

means whereby a herbicide or the like is provided to the interior of said first conduit; and means for applying a vacuum to the interior of said second conduit;

whereby herbicide or the like provided by said first conduit to said wick means in excess of that required to saturate the wick means to a desired degree will be drawn into said second conduit.

8. The wick applicator of claim 7 wherein said vacuum applying means comprises means for recirculating herbicide drawn into said second conduit to said first conduit.

9. A wick applicator for herbicides or the like comprising:

a horizontally elongated frame including a manifold;

wick means mounted on said frame and being in fluid communication with said manifold, said wick means being disposed so as to contact vegetation when said applicator is advanced across a planted area below the tops of vegetation growing in such area;

means for providing a herbicide or the like to said wick means so that vegetation contacted by said wick means will have herbicide or the like applied thereto; and means associated with said manifold for causing excess herbicide or the like on said wick means to enter said manifold for collection therein.

10. The wick applicator of claim 9 wherein said frame maintains at least a portion of said wick means at an elevation above said manifold and wherein said causing means comprises a pump having an inlet in fluid communication with said manifold and an outlet connected to said providing means to thereby cause recirculation of excess herbicide or the like to minimize consumption thereof.

* * * * *